(12) United States Patent
Gustlin et al.

(10) Patent No.: US 10,158,686 B2
(45) Date of Patent: Dec. 18, 2018

(54) SYSTEM AND METHOD FOR PROVIDING AN ETHERNET INTERFACE

(71) Applicant: Cisco Technology, Inc., San Jose, CA (US)

(72) Inventors: Mark A. Gustlin, Campbell, CA (US); Oded Trainin, Raanana (IL); Luca Della Chiesa, Milan (IT)

(73) Assignee: Cisco Technology, Inc., San Jose, CA (US)

( * ) Notice: Subject to any disclaimer, the term of this patent is extended or adjusted under 35 U.S.C. 154(b) by 92 days.

(21) Appl. No.: 14/995,544

(22) Filed: Jan. 14, 2016

(65) Prior Publication Data

US 2016/0134671 A1 May 12, 2016

Related U.S. Application Data

(63) Continuation of application No. 14/662,860, filed on Mar. 19, 2015, now Pat. No. 9,800,630, which is a
(Continued)

(51) Int. Cl.
*H04L 29/06* (2006.01)
*H04L 12/801* (2013.01)
(Continued)

(52) U.S. Cl.
CPC ....... *H04L 65/4069* (2013.01); *H04B 10/516* (2013.01); *H04L 47/10* (2013.01);
(Continued)

(58) Field of Classification Search
CPC ..... H04L 65/4069; H04L 47/10; H04L 47/13; H04L 47/39; H04L 49/352; H04J 14/02;
(Continued)

(56) References Cited

U.S. PATENT DOCUMENTS 6,222,848 B1 4/2001 Hayward et al.
6,623,186 B2 9/2003 Rumer
(Continued)

OTHER PUBLICATIONS

"Stratix GX Device Handbook, vol. 2, Sect. 5, XAUI Mode," Altera, Jun. 2006, pp. 5-1 thru 5-48.
(Continued)

*Primary Examiner* — Kibrom T Hailu
(74) *Attorney, Agent, or Firm* — Baker Botts L.L.P.

(57) ABSTRACT

An apparatus is provided that includes communication channels, and m communication media interfaces, and v virtual lanes. V is a positive integer multiple of the least common multiple of m and n. An information stream is transferred into data and alignment blocks striped across all of the v virtual lanes, the blocks being communicated from the virtual lanes onto the communication channels. The blocks are received on the communication channels. Each of the communication channels transmits a different portion of the blocks striped across all of the v virtual lanes.
In more particular embodiments, v>=n>=m. The communication media interfaces can be electrical and optical. Each of the communication channels can include a SerDes interface operating at least 5 Gigabits per second. Furthermore, each of the m communication media interfaces is configured to transmit a different stream of information over a single optical fiber.

25 Claims, 5 Drawing Sheets

Related U.S. Application Data continuation of application No. 12/001,551, filed on Dec. 11, 2007, now Pat. No. 9,014,563.

(60) Provisional application No. 60/869,505, filed on Dec. 11, 2006.

(51) Int. Cl.
  *H04B 10/516* (2013.01)
  *H04L 12/931* (2013.01)
  *H04J 14/02* (2006.01)

(52) U.S. Cl.
  CPC .............. *H04L 47/13* (2013.01); *H04L 47/39* (2013.01); *H04L 49/352* (2013.01); *H04J 14/02* (2013.01)

(58) Field of Classification Search
  CPC ........... H04J 14/0246; H04J 2203/0085; H04J 3/0632; H04B 10/516
  See application file for complete search history.

(56) References Cited

U.S. PATENT DOCUMENTS

| | | | |
|---|---|---|---|
| 6,650,638 B1 | 11/2003 | Walker et al. | |
| 6,654,824 B1* | 11/2003 | Vila | H04L 7/005 710/52 |
| 6,731,875 B1* | 5/2004 | Kartalopoulos | H04J 14/02 398/68 |
| 6,757,348 B1* | 6/2004 | Vila | G06F 5/065 370/356 |
| 6,766,464 B2* | 7/2004 | Collier | H04L 5/1469 327/158 |
| 6,967,949 B2 | 11/2005 | Davis et al. | |
| 7,020,729 B2 | 3/2006 | Taborek, Sr. et al. | |
| 7,088,921 B1 | 8/2006 | Wood | |
| 7,167,648 B2 | 1/2007 | Heinz et al. | |
| 7,245,628 B2 | 7/2007 | Shi et al. | |
| 7,257,326 B2 | 8/2007 | Song et al. | |
| 7,260,119 B2 | 8/2007 | Sala et al. | |
| 7,274,695 B2 | 9/2007 | Kim et al. | |
| 7,274,874 B2 | 9/2007 | Sung et al. | |
| 7,286,538 B2 | 10/2007 | Song et al. | |
| 7,289,439 B2 | 10/2007 | Lee et al. | |
| 7,289,501 B2 | 10/2007 | Davis | |
| 7,300,214 B2 | 11/2007 | Doo et al. | |
| 7,300,970 B2 | 11/2007 | Durel et al. | |
| 7,305,551 B2 | 12/2007 | Kim et al. | |
| 7,729,389 B1 | 6/2010 | Lo | |
| 7,782,805 B1* | 8/2010 | Belhadj | H04L 47/00 370/300 |
| 7,822,110 B1* | 10/2010 | Doblar | H04B 3/32 375/224 |
| 9,014,563 B2 | 4/2015 | Gustlin | |
| 2001/0046074 A1 | 11/2001 | Kakizaki et al. | |
| 2002/0018444 A1* | 2/2002 | Cremin | H04J 3/0629 370/235 |
| 2003/0095564 A1 | 5/2003 | Feuerstraeter et al. | |
| 2003/0103253 A1* | 6/2003 | Bunton | H04J 3/047 398/74 |
| 2003/0214975 A1* | 11/2003 | Woelk | H04L 25/14 370/503 |
| 2003/0217215 A1 | 11/2003 | Taborek et al. | |
| 2004/0068593 A1 | 4/2004 | Helenic et al. | |
| 2005/0005051 A1* | 1/2005 | Tseng | G06F 13/385 710/310 |
| 2005/0129408 A1* | 6/2005 | Kim | H04B 10/30 398/140 |
| 2005/0286529 A1 | 12/2005 | Arulambalam et al. | |
| 2006/0002385 A1* | 1/2006 | Johnsen | H04L 49/25 370/389 |
| 2006/0156083 A1* | 7/2006 | Jang | G06F 13/423 714/700 |
| 2006/0206642 A1* | 9/2006 | Wedding | H04L 25/14 710/71 |
| 2007/0041408 A1 | 2/2007 | Kang | |
| 2007/0234172 A1* | 10/2007 | Chiabrera | H04L 1/0043 714/752 |
| 2008/0080562 A1* | 4/2008 | Burch | H04J 3/0667 370/503 |
| 2008/0095541 A1 | 4/2008 | Dallesasse | |
| 2008/0138075 A1 | 6/2008 | Gustlin | |
| 2010/0092174 A1 | 4/2010 | Brown et al. | |
| 2010/0142525 A1 | 6/2010 | Cho et al. | |
| 2013/0077623 A1 | 3/2013 | Han | |
| 2013/0083810 A1 | 4/2013 | Ghiasi et al. | |
| 2013/0217215 A1 | 11/2013 | Taborek et al. | |
| 2015/0195043 A1 | 7/2015 | Gustlin | |

OTHER PUBLICATIONS

M. A. Gustlin, U.S. Appl. No. 12/001,551, Non-final Office Action dated Oct. 29, 2010.
M. A. Gustlin, U.S. Appl. No. 12/001,551, Amendment to Non-final Office Action dated Jan. 25, 2011.
M. A. Gustlin, U.S. Appl. No. 12/001,551, Final Office Action dated Apr. 15, 2011.
M. A. Gustlin, U.S. Appl. No. 12/001,551, Request for Continued Examination and Amendment dated Jul. 11, 2011.
M. A. Gustlin, U.S. Appl. No. 12/001,551, Non-final Office Action dated Feb. 27, 2014.
M. A. Gustlin, U.S. Appl. No. 12/001,551, Response to Non-final Office Action dated Apr. 30 2014.
M. A. Gustlin, U.S. Appl. No. 12/001,551, Final Office Action dated Aug. 12, 2014.
M. A. Gustlin, U.S. Appl. No. 12/001,551, Request for Continued Examination and Amendment dated Nov. 12, 2014.
M. A. Gustlin, U.S. Appl. No. 12/001,551, Notice of Allowance dated Dec. 19, 2014.

* cited by examiner

FIG. 3

| CTBI LANES | PMD LANES | LCM | VIRTUAL LANES |
|---|---|---|---|
| 10 | 12 | 60 | 60 |
| 10 | 10 | 10 | 10 |
| 10 | 8 | 40 | 40 |
| 10 | 5 | 10 | 10 |
| 10 | 4 | 20 | 20 |
| 10 | 3 | 30 | 30 |
| 10 | 2 | 10 | 10 |
| 10 | 1 | 10 | 10 |

— 30

| NUMBER OF CTBI LANES | SUPPORTABLE PMDs | VIRTUAL LANES NEEDED |
|---|---|---|
| 10, 5, 4, 2, 1 | 1, 2, 3, 4, 5, 6, 8, 10, 12 | 120 |
| 10, 5, 4, 2, 1 | 1, 2, 3, 4, 5, 10 | 60 |
| 10, 5, 4, 2, 1 | 1, 2, 4, 5, 10 | 20 |
| 10, 5, 2, 1 | 1, 2, 5, 10 | 10 |

— 32

| 10 | Frm1 | Frm2 | TBD | TBD | TBD | TBD | ~VL# | VL# |

| # VIRTUAL LANES | # ELECTRICAL LANES | # OPTICAL LANES | ORIGINAL RUN LENGTH | RUN LENGTH AFTER MUXING |
|---|---|---|---|---|
| 20 | 10 | 10 | 1 | 2 |
| 20 | 10 | 5 | 1 | 4 |
| 20 | 10 | 4 | 1 | 5 |
| 20 | 10 | 2 | 1 | 10 |
| 20 | 10 | 1 | 1 | 20 |
| 20 | 10 | 10 | 2 | 4 |
| 20 | 10 | 5 | 2 | 8 |
| 20 | 10 | 4 | 2 | 10 |
| 20 | 10 | 2 | 2 | 20 |
| 20 | 10 | 1 | 2 | 40 |
| 20 | 10 | 10 | 4 | 8 |
| 20 | 10 | 5 | 4 | 16 |
| 20 | 10 | 4 | 4 | 20 |
| 20 | 10 | 2 | 4 | 40 |
| 20 | 10 | 1 | 4 | 80 |
| 20 | 5 | 1 | 4 | 80 |

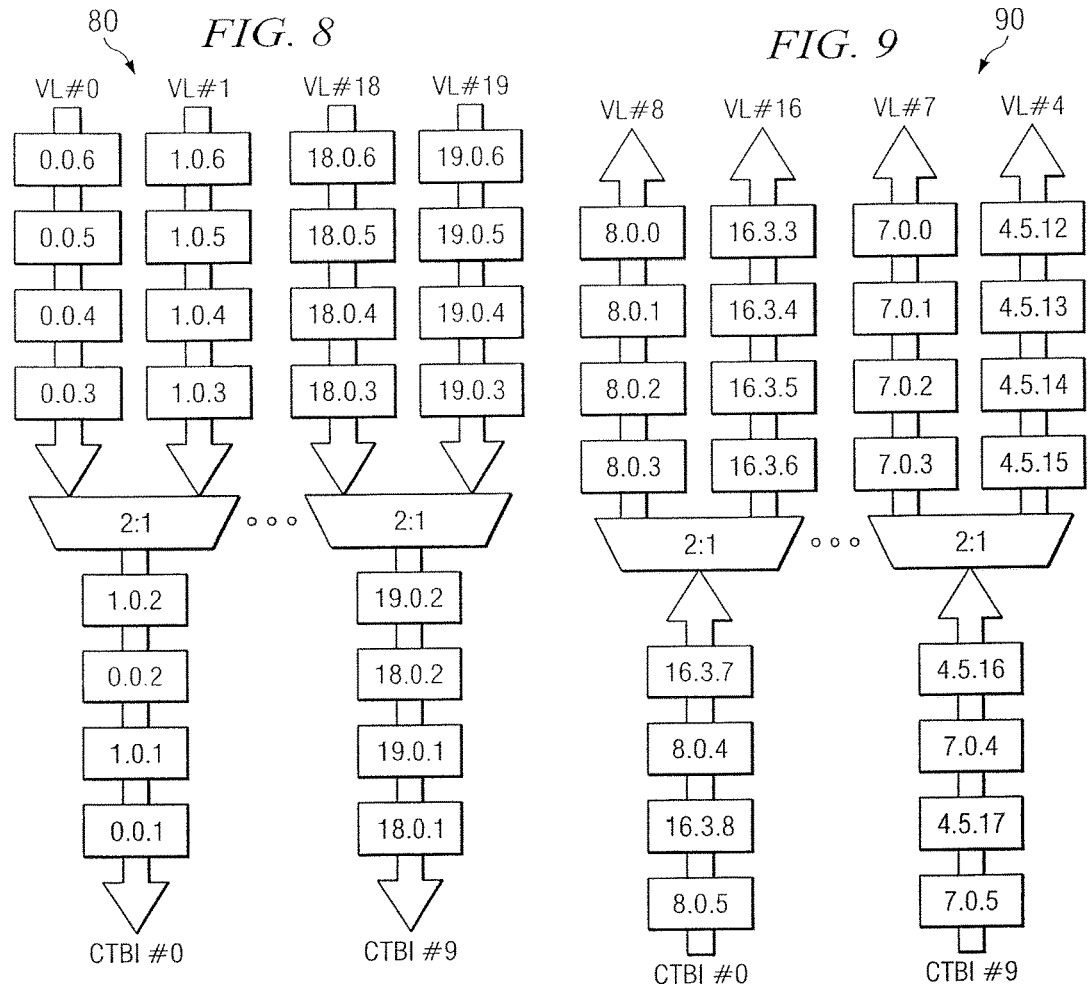
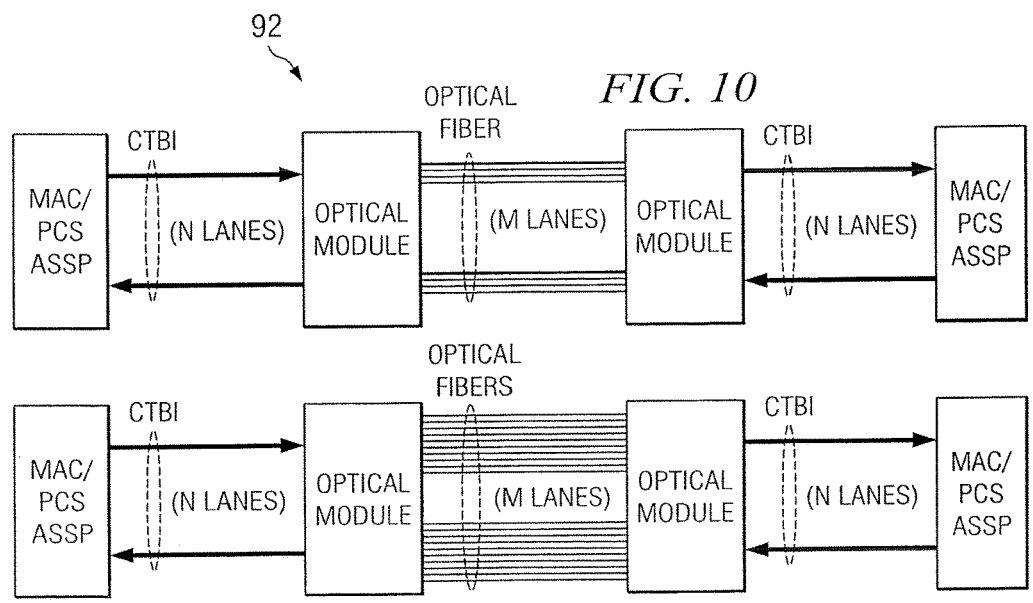

SYSTEM AND METHOD FOR PROVIDING AN ETHERNET INTERFACE

CROSS-REFERENCE TO RELATED APPLICATION

This application is a continuation of U.S. application Ser. No. 14/662,860 filed Mar. 19, 2015 and entitled "System and Method for Providing an Ethernet Interface" which is a continuation of U.S. application Ser. No. 12/001,551 filed Dec. 11, 2007 and entitled "System and Method for Providing an Ethernet Interface" which claims priority under 35 U.S.C. § 119 of provisional application number 60/869,505 filed Dec. 11, 2006, entitled "System and Method for Providing an Ethernet Interface". This continuation application also incorporates by reference the utility and provisional applications in their entirety.

TECHNICAL FIELD OF THE INVENTION

This invention relates generally to the field of communications and, more particularly, to a system and a method for providing an Ethernet interface.

BACKGROUND

Communication systems and architectures have become increasingly important in today's society. One aspect of such architectures relates to interfaces, which can maximize bandwidth and minimize delays associated with data and information exchanges. Many architectures for effectuating proper data exchanges can add significant overhead and cost in order to accommodate a large number of data streams. In addition, as the size of data streams increases, communication systems should be developed to meet these robust conditions. Performance and compatibility are two eminent concerns for any person who is relegated the difficult task of developing an interface standard.

Accordingly, the ability to provide a communications system that consumes few resources, optimizes bandwidth, achieves superior performance, and offers minimal delay presents a significant challenge for network operators, service providers, and system administrators alike.

BRIEF DESCRIPTION OF THE DRAWINGS

For a more complete understanding of the present invention and its advantages, reference is now made to the following description, taken in conjunction with the accompanying drawings, in which:

FIG. 3 illustrates simplified tables that depict Virtual Lane (VL) Least Common Multiple examples;

FIG. 4 is a simplified block diagram of an example alignment block format;

FIG. 6 is a simplified block table of run length limits;

FIG. 7 is a simplified block table illustrating VL encoding;

FIG. 8 is a simplified block diagram of a virtual lane muxing flow;

FIG. 9 is a simplified block diagram of a virtual lane deskew flow; and

FIG. 10 is a simplified block diagram of a skew arrangement in accordance with one example embodiment.

OVERVIEW

Figure 2:
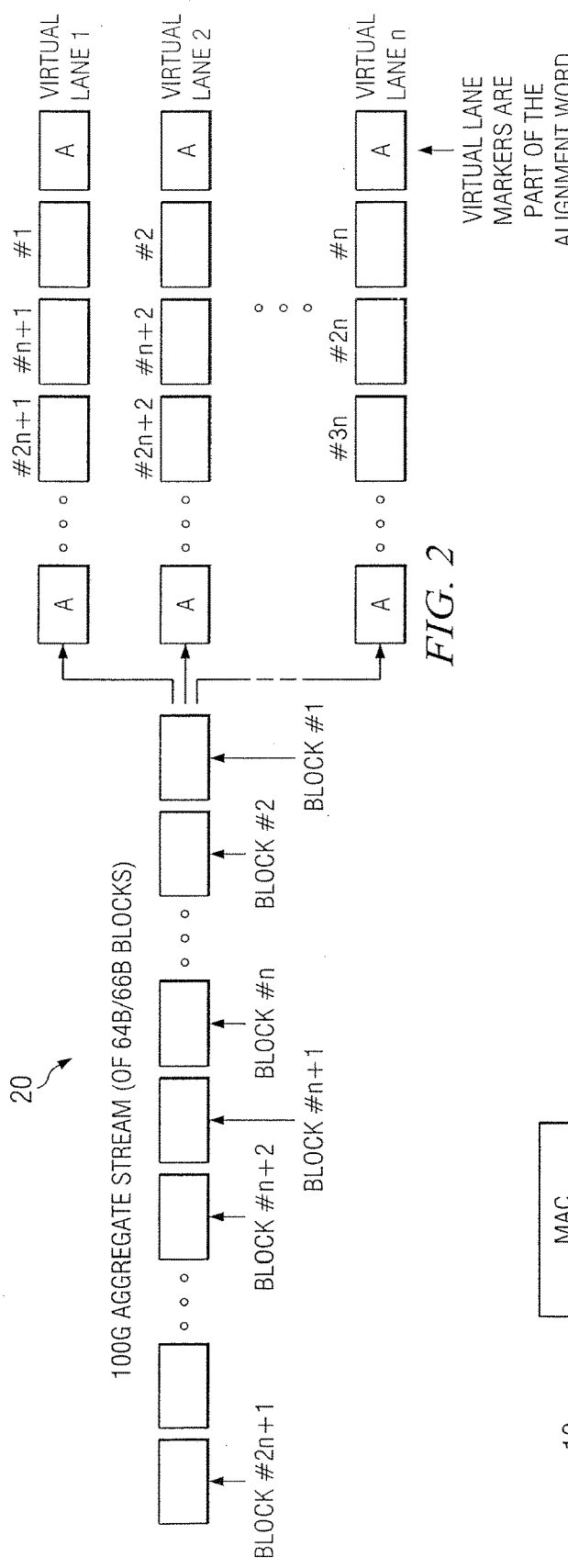
FIG. 2 is a simplified block diagram of an example creation of virtual lanes.

In one embodiment of the invention, an apparatus is provided that includes n communication channels, m communication media interfaces, and v virtual lanes. V is a positive integer multiple of the least common multiple of m and n. An information stream is transferred into data and alignment blocks striped across all of the v virtual lanes, the blocks being communicated from the virtual lanes onto the communication channels. The blocks are received on the communication channels. Each of the communication channels transmits a different portion of the blocks striped across all of the v virtual lanes.

Certain embodiments of the present invention include software for providing security in a network environment. The software may be embodied in a computer readable medium and may include computer code that can transfer an information stream into data and alignment blocks striped across v virtual lanes where n communication channels and m communication media interfaces are present. In certain embodiments, the computer code communicates the blocks being received on the communication channels.

In more particular embodiments, $v >= n >= m$. The communication media interfaces can be electrical and optical. Each of the communication channels can include a SerDes interface operating at least 5 Gigabits per second. Furthermore, each of the m communication media interfaces is configured to transmit a different stream of information over a single optical fiber. The single fiber is only one case, other cases could include multiple fibers and/or copper could be used.

In still other embodiments, the transforming includes one or more encoding modules for encoding the information stream into the data blocks using 64B/66B encoding (or other types of encoding could certainly be used). Also, each particular alignment block of the alignment blocks uniquely identifies on which of the virtual lanes the particular alignment block was placed.

A technical advantage of certain embodiments includes enabling lane bonding/aggregation at electrical and optical levels with a single alignment mechanism. This solution could allow for one PCS for many PMDs. In addition, in the proposed architecture there is low overhead, which is independent of packet size. Such a solution also minimizes latency, and minimizes buffer sizes: both of which are advantageous. Embodiments that follow may enjoy some, all, or none of these advantages.

DETAILED DESCRIPTION OF EXAMPLE EMBODIMENTS

The present invention provides a new interface that is scaled to meet the needs for 100 GE. Such an optimal interface incorporates the optical level encoding. In addition, it allows the electrical interface encoding to be reused on the optical side even if the number of optical lanes is less than the number or electrical lanes with just simple multiplexing. There exists a need to define a new 100-gigabit electrical interface to a 100-gigabit optical module, as part of the 100 Gigabit Ethernet Standard (this can also be applied to the 40 Gigabit Ethernet Standard). Note that the present invention is not limited to 100 G, but readily includes 40 G models, and can fit future rates. A new electrical interface to a 100-Gb optical module should be defined as part of the 100 GE standard. Past interface examples include XGMII, XAUI, and XFI for 10 GE.

Note that certain definitions should be understood before proceeding further with the proposed concept. The CTBI lane is an electrical path from the transmit PCS to the transmit PMA, and from the receive PMA to the receive PCS. The PMA lane is an optical path from the transmit PMD to the receive PMD. The virtual lane is not a physical path, but rather a virtual path that can be multiplexed and carried across either an electrical or an optical embodiment. The proposed electrical interface is ten (or four in the case of 40 Gigabit Ethernet) SERDES lanes: each run at 10.3 GHz and transporting two, bit multiplexed, virtual lanes encoded using 64B/66B encoding along with special alignment words. [As explained more fully below, the encoding is not bounded to SERDES and the electrical line and instead is bounded to the virtual lines.] The tendered proposal covers both support for PMA with alignment capabilities and a simple bit muxing PMA. The virtual lanes concept and the architecture and implementation PCS and PMA that support that concept are described below.

One method of the present invention defines a new electrical interface for a 100-Gb optical module. Past interface examples are XGMII, XAUI, and XFI for 10 GE. A new interface has been developed that builds on the past 10 G interfaces, but that is scaled to meet the needs for 100 GE and, further, that incorporates the optical encoding. It allows the electrical interface encoding to be reused on the optical side even if the number of optical lanes is less than the number or electrical lanes with just simple multiplexing.

The proposed electrical interface is ten SERDES lanes, where each run at 10.3125 GHz each of them transporting two virtual lanes encoded using standard 64B/66B and bit multiplexed (along with special alignment words). The standard 64B/66B encoding provides for frame delineation, and a guarantee of at least one clock transition per 66 bits. In addition, scrambling is performed on the 64 bits of data in order to provide greater transition density.

In operation, the data coming from a 100 G MAC can be striped 8 bytes at a time across each 20 virtual lanes and encoded in 64B/66B encoding. A special alignment code can be sent on each virtual lanes periodically. The alignment code will use reserved values of the standard 64B/66B encoding values, and can take 80 bytes of overhead to send. This will allow the receiving side to re-align the lanes of data, even after sending it over the 10 electrical lanes and a smaller number of optical lanes. For instance a typical application is twenty virtual lanes bit multiplexed and transmitted over a ten lane electrical interface to an optical module, and within the optical module it can be bit multiplexed down again to five lanes (or two, or four, etc.) in order to go over five separate fibers or wavelengths.

On the receiver side, the lanes can be first bit demultiplexed down to 10 lanes in the optical module, sent again across a ten-lane electrical interface and finally, back up to the MAC layer, demultiplexed to twenty virtual lanes, decoded and realigned using the alignment code, before extracting the transmitted data.

The bandwidth that is used for the alignment mechanism can be regained by defining an Alignment Deficit Counter (ADC), which over time will borrow Inter-Packet Gaps bytes (IPG) so that the overall line rate of 100 G is 10×10 GE. The plan is to 'steal' four bytes each packet until the ADC is at 80, and then the alignment words can be sent.

There are some keys to this proposed concept, including reusing familiar 64B/66B encoding, while adding a multi-lane alignment mechanism. Furthermore, this alignment mechanism can be reused for both the electrical interface and at the optical interface without re-encoding the data. Such a concept provides an efficient 100 G electrical and optical encoding method and protocol. Additionally, a deficit counter mechanism allows for a full line rate.

Thus, features of the proposed concept include alignment words: one alignment word per virtual lane per 16K words sums to 0.006%, and virtual lanes that provide a mechanism to support alignment only on the receive PCS (none necessarily in the optical module).

Note that there is little work in the area of 100 GE interfaces since the standard is in its infancy. Other proposals for bonding lanes together are fixed fragment-based, which has a high overhead (10-40%) that is problematic.

Note that in taking a step back from the details of the proposed idea, considerations for the interface include: supporting a single rate MAC speed (100 G or 40 G); optical and electrical technologies requiring a multi-channel/lane approach; channels needing to be bonded into one flow; scheme needing to be robust to technology advances; allowing future PMDs with reduced numbers of channels; minimizing complexity of PMDs/Optical Modules; low overhead that is independent of packet size; enabling small buffers; allowing for differential delay due to wavelengths/fibers; and no auto-negotiation required between end points.

Non-considerations for the interface include support for a scalable MAC; one MAC rate for the MAC client is preferred; resiliency to single lane failures (not considered necessary since a system level); redundancy would be required in any event (e.g. cable break, card-power failure); and working/protection links more than likely to be used.

Figure 1:
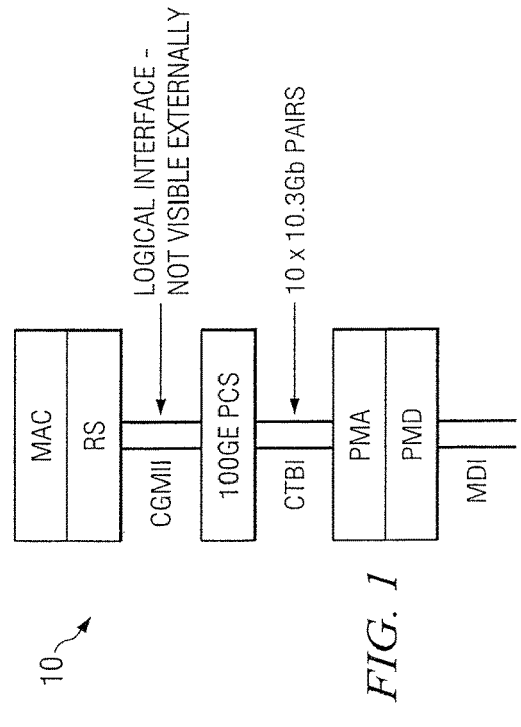
FIG. 1 is a simplified block diagram showing an example IEEE 802.3 protocol stack in which the present invention may be integrated.

FIG. 1 is a simplified block diagram showing an example IEEE 802.3 protocol stack 10. This illustration can serve as a CTBI implementation overview. The proposed CTBI interface is the standards-based interface between the PCS layer and the PMA layer. In terms of IEEE terminology: MAC=Media Access Control; RS=Reconciliation; CGMII—100 G M-Independent Interface; CTBI=100 G Ten Bit Interface; PCS=Physical Coding Sublayer; PMA=Physical Medium Attachment; and PMD=Physical Medium Dependent.

In terms of a transmit overview, the interface consists of ten SerDes per-direction: each running at 10.3125 Gbps raw rate. In the transmit direction, the following is done in the PCS. The aggregate 100 Gbps stream is first encoded into 64B/66B blocks using the same rules as 10 GBASE-R. This allows frames to be delineated, in addition to allowing control blocks to be sent, idles being identified, etc. 64 bits of each 66-bit block are scrambled by a self-synchronous scrambler in order to provide transition density and control DC balance.

Note that the definition of CTBI allows simplified implementation of muxing function to enable support of many variants of PMDs that may be defined. Note also that each of the communication media interfaces can be operating at a different wavelength multiplexed over a same optical fiber in a wave division multiplex (WDM) application.

Then the 66-bit blocks are inverse multiplexed to virtual lanes. Virtual lanes allow the ability to only have alignment in the receive PCS. Added to each virtual lane is a periodic alignment block, which identifies the virtual lane and allows the receiver to get everything back in alignment (this interrupts packet transmission). Block 1 goes to VL 1, block two goes to VL 2, block n goes to VL n, block n+1 goes to VL 1, etc.

Subsequently, the virtual lanes are bit multiplexed onto each electrical lane. If there are twenty VLs and ten electrical lanes, this means that two VLs are bit multiplexed together onto each electrical lane. An interesting note, it does not matter which VL goes to which electrical interface, in fact, this interface is completely tolerant of misconnections of the electrical interface SerDes lanes. Each 10.3125 G stream is then sent to a SerDes for transmission to the optical module.

In terms of the receive overview, the interface consists of ten SerDes per-direction: each running at 10.3125 Gbps raw rate. In the receive direction, the following is done in the PCS. Each 10.3125 G stream is received from a SerDes from the optical module. Then the virtual lanes are bit demultiplexed from each electrical lane into VLs. If there are twenty VLs and ten electrical lanes, this means that two VLs are bit de-multiplexed from the each electrical lane. Now the receiver will find a 66-bit alignment on each VL independently. This follows the same process as 10 GBASE-R uses. Once a 66-bit alignment is discovered on all VLs, then the VLs should be aligned. This is done via some amount of buffering and pointers within the receive PCS. The alignment blocks were not scrambled so those can be found, and then the delay between the VLs can be compensated for.

Once VL alignment is found, then the data is again a coherent 100 G stream. It can now be descrambled (just the 64 bits, not necessarily the two overhead bits). The aggregate 100 Gbps stream is then decoded back into frame streams, which can be sent up to the MAC.

FIG. 2 is a simplified block diagram of an example creation of virtual lanes 20. A virtual lane is a continuous stream of 66-bit words simply plucked from the aggregate 100 G stream. In the case of twenty VLs, a single VL contains ½0th of the original 100 G stream, every 20th 66-bit block. FIG. 2 shows how VLs are created.

After the VLs are created, alignment blocks are added to each VL periodically and at the same time. This will allow the receiver to re-align everything. VLs are created to ensure that all of the bits for a particular stream of 66-bit words are transmitted on the same CTBI and PMD lane combination. This will ensure that all of the bits for any particular virtual lane do not experience any differential (bit-to-bit) skew and are, therefore, always received in the correct order at the receive PCS.

If the bits for a virtual lane were not constrained to be transmitted on the same CTBI and PMD lane combination, then the bits would arrive out of order at the receiving end of the link (after each of the bits having experienced different delays) and there would be no way to piece together the information.

There will still be a differential delay between the different virtual streams, as these will have passed over different CTBI and PMD lanes, but it is a simple task to use the markers added to each virtual lane to detect and compensate for this skew. This allows the receive PCS to be able to demultiplex all of the virtual streams back into one single continuous 100 G aggregate stream with all of the individual 66-bit words in the correct order.

In addressing how many VLs are needed, this depends on which optical and electrical lane combinations are sought to be supported. What should ideally be chosen is the least common multiple of the number of electrical lanes and the number of optical lanes (be they wavelengths, fibers etc). Having the LCM of these two numbers will ensure that the bits for a VL stay on one combination of the interfaces.

FIG. 3 illustrates simplified tables 30 and 32 that depict VL LCM examples. Specifically, table 32 illustrates a VL sweet spot. Many different optical modules with the same electrical interface should be able to be supported. Note that twenty VLs might be the sweet spot. In addition, if twenty VLs are chosen, the electrical interface can also scale down to five, four, two, or even a single lane over time without any concerns or interoperability problems.

In terms of the virtual lane creation, virtual lanes can be created simply by a round robin function that plays out the 66-bit blocks in order to each virtual lane. If there are twenty VLs, then after twenty VLs, the user is back to the beginning (VL#0).

FIG. 4 is a simplified block diagram of an example alignment block format 40. In regards to alignment addition, in order for the receiver to make sense of all of the data it receives, an alignment block should be added to each VL. This is simply a special 66-bit block that will not be duplicated.

Figure 5:
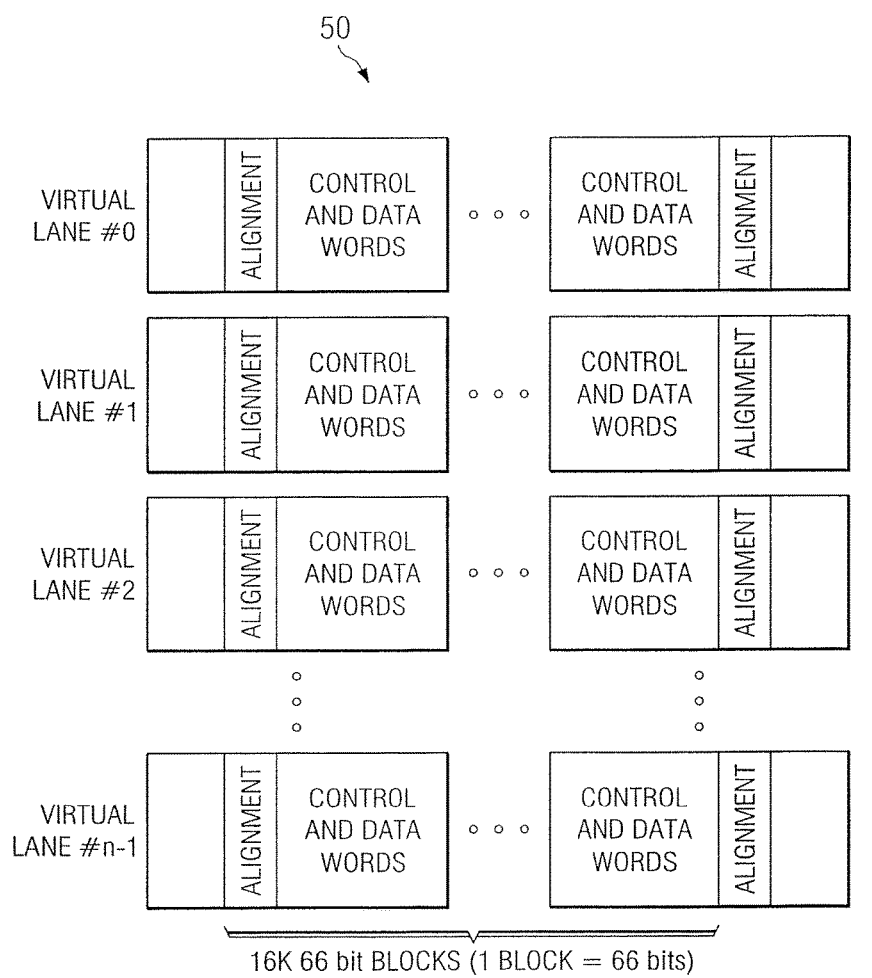
FIG. 5 is a simplified block diagram of an example alignment 50.

FIG. 5 is a simplified block diagram of an example alignment 50. The alignment block is sent on all VLs at the same time, temporarily interrupting traffic. The word itself is DC balanced (and not scrambled), and then the VL# is sent both normal and inverted to get DC balance. For the twenty VL case, VL# is 0-19. There are some concerns with run lengths and the alignment patterns due to the muxing that is performed. Briefly, this is a problem because when muxing fixed patterns together, if things are aligned, then longer static patterns with low transition densities occur. The proposed alignment pattern is a fixed pattern for all virtual lanes except for the VL field. These are several layers of muxing, which makes the problem worse. The following table gives examples of the worst-case run lengths depending on the levels of muxing and the original run length (pre-muxing).

Figures 6, 7:
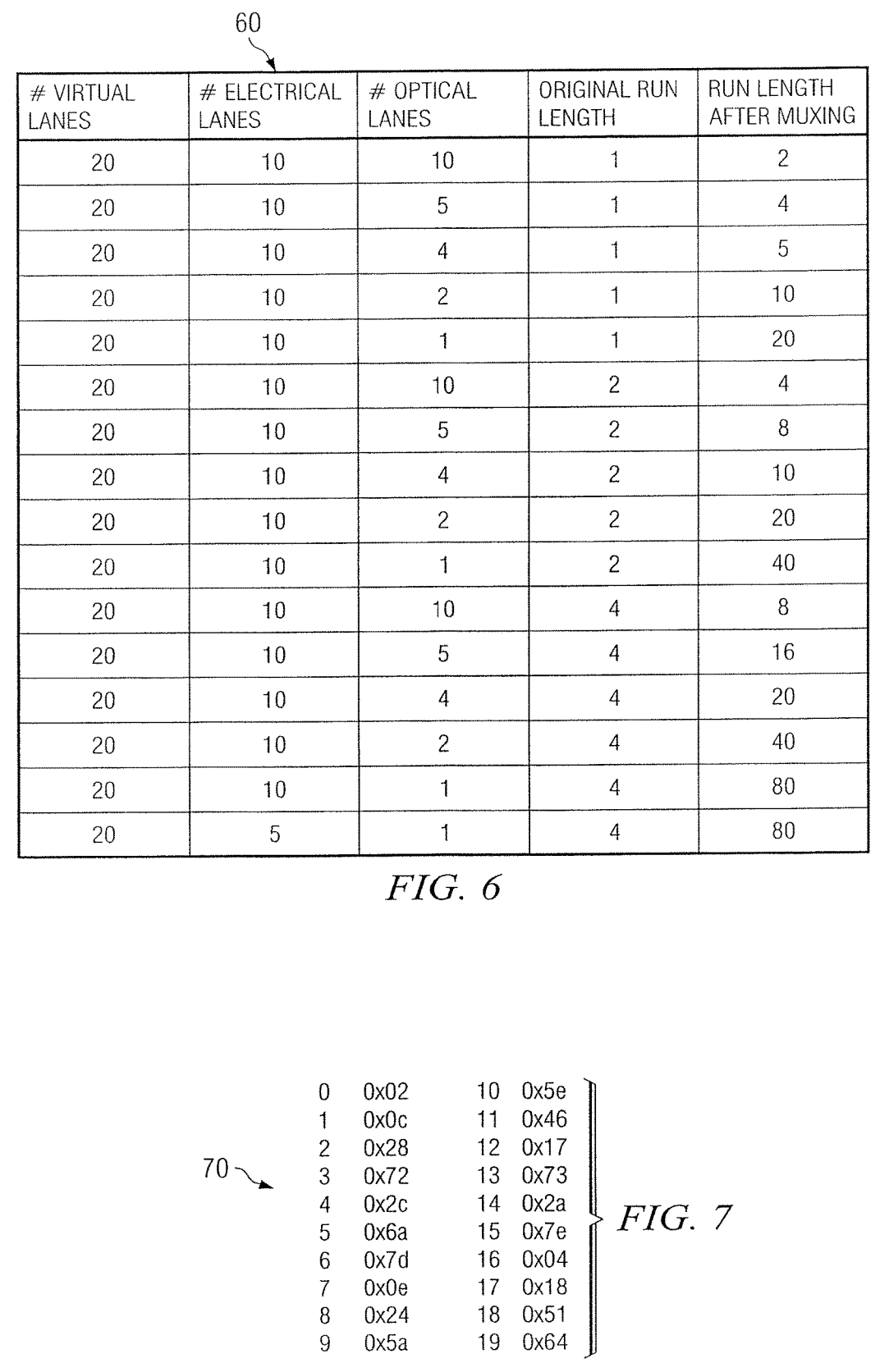

FIG. 6 is a simplified block table 60 of run length limits. FIG. 7 is a simplified block table 70 illustrating the VL encoding. Adding skew between VLs makes this problem less severe. The longest run length is four within the alignment word [except for the VL#s]. That can be greater than four for the initial run length, but to take care of that some special encoding of the VL numbers is necessary. For most serdes, handling a run length of 80 is not detrimental; typical run length maximums for SONET tend to be 100 bits.

If there are greater than twenty VLs, then potentially the run length could become a problem. In that case, different patterns (that look more random) could be sent on each VL for the alignment block, which would reduce the chance of interference.

FIG. 8 is a simplified block diagram of a virtual lane muxing flow 80. Virtual lane muxing is straightforward; it is simply bit level muxing of all of the VLs destined for a single interface. In the case of twenty VLs being muxed into ten electrical lanes, then two VLs are muxed into each electrical lane. Normally VL0 and VL1 would be muxed to electrical lane 0 and so on, but in reality for this protocol it does not matter. FIG. 8 shows the virtual lane muxing (first number is VL#, second is block number, last is the bit number).

FIG. 9 is a simplified block diagram of a virtual lane deskew flow 90. Virtual lane demuxing is similarly straightforward; it is simply bit level demuxing of all of the VLs from a single CTBI lane. In the case of twenty VLs and ten electrical lanes then that means there are two VLs muxed into each electrical lane and so a 2:1 demux circuit is used. In the receive direction, due to electrical and optical skew, virtual lanes are normally transposed when compared to where they were originally sent out (not a concern though since the Rx PCS can deal with this).

FIG. 10 is a simplified block diagram of a skew arrangement 92 in accordance with one example. In regards to lane alignment, once there is block alignment on each VL, a person can proceed in re-aligning the VL lanes and putting them back in order. Note that each VL can be skewed in time, but also in location. Virtual lanes moved CTBI lanes compared to where they were originally sent. Alignment is actually straightforward. All virtual lanes data will be temporarily stored in per VL buffers. The size of the buffers will need to take into account the maximum skew that can be expected, from both the electrical and optical components.

FIG. 10 shows the components that can introduce skew (and the muxing introduces the transposition). In the MAC/PCS ASSP there is electrical skew, across the CTBI there is board level skew, in the optical module there is optical and electrical skew. In the single mode optical fiber there is skew due to the speed at which the different wavelengths travel. For the parallel multi-mode application there is skew due to fiber length mismatch.

The following are the worst-case Optical Skew numbers:
For up to 300 m of MM, 30 nsec;
For 10 km SM, 5 channels, 17 ns; and
For 1000 km, 10 channels, 543 ns.

For electrical skew, XAUI's specification for electrical skew is 41 UI, or about 13 ns. Assume that there are many places for electrical skew: Tx CTBI, in the Tx optical module, in the Rx optical module, and in the Rx CTBI. That is at least four different skew sets, so lets go with 4*the XAUI budget for now, or 52 ns for electrical skew. Therefore, the worst-case total skew is ~600 ns. This equates to $60k$ bits of memory needed for this function. Rounding up to 1 u-sec, then it is 100 k bits of memory (~0.2 mm square per 1 uS in 65 nm) needed for the deskew/alignment function.

As the virtual lane data is stored into each VL buffer, the alignment word is searched for. This is done simply by looking for the alignment pattern (as shown in section 3.1.5 above). Once a candidate control block matches the alignment pattern (excluding the VL fields), the receiver will look again 16 k blocks later for the next alignment block. If four are found in a row error free, then alignment on that VL is declared. In one example, if four in a row are found to be in error, then out of alignment is declared for that VL.

Once the alignment block is found on all VLs, then the data can be read out in order to re-create the original 100 G data stream. Data is re-aligned and reordered by reading it out in from the appropriate buffers based on the alignment blocks. Now that the 100 G stream is recreated, descrambling can take place.

In summary, the CTBI is proposed as a potential interface for HSSG. It enables lane bonding/aggregation at electrical and optical levels with a single alignment mechanism. This solution allows for one PCS for many PMDs. There is low overhead, which is independent of packet size. It minimizes latency, and minimizes buffer sizes: both of which are advantageous.

Some of the steps discussed with reference to the preceding FIGURES may be changed or deleted where appropriate and additional steps may also be added to these process flows. These changes may be based on specific communication architectures or particular interfacing arrangements and configurations of associated elements and do not depart from the scope or the teachings of the present invention.

Additionally, although described in specific environments and contexts, the present invention could be used in countless applications. Numerous other changes, substitutions, variations, alterations, and modifications may be ascertained by those skilled in the art and it is intended that the present invention encompass all such changes, substitutions, variations, alterations, and modifications as falling within the spirit and scope of the appended claims. Moreover, the present invention is not intended to be limited in any way by any statement in the specification that is not otherwise reflected in the appended claims.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

What is claimed is:

1. A system, comprising:
one or more receivers configured to receive a first information stream;
one or more encoding modules configured to transform the first information stream into a plurality of data blocks; and
one or more muxes configured to multiplex the plurality of data blocks of the first information stream onto a plurality of communication channels using one or more alignment blocks indicating alignments of the plurality of data blocks within the first information stream, wherein:
each of the one or more alignment blocks identifies a virtual lane on which the respective alignment block is placed;
each of the one or more alignment blocks is stored in a virtual lane buffer;
each virtual lane buffer is sized based on an amount of skew expected from electrical and optical components; and
the size of each virtual lane buffer is determined prior to the electrical and optical components generating skew.

2. The system of claim 1, wherein multiplexing the plurality of data blocks of the first information stream onto a plurality of communication channels using one or more alignment blocks comprises distributing the data blocks onto the plurality of communication channels round robin.

3. The system of claim 2, wherein the one or more muxes is further configured to insert the alignment blocks onto the plurality of communication channels periodically.

4. The system of claim 1, wherein each alignment block comprises 66 bits of data.

5. The system of claim 1, wherein each data block comprises 66 bits of data.

6. The system of claim 1, wherein:
the one or more receivers are further configured to:
receive, from the plurality of communication channels, a second information stream comprising a plurality of data blocks and one or more alignment blocks; and
the one or more muxes are configured to de-multiplex the data blocks of the second information stream using the one or more alignment blocks of the second information stream.

7. The system of claim 1, wherein the first information stream comprises an aggregate of a plurality of frame streams.

8. The system of claim 7, wherein the first information stream has a data rate of 100 gigabits per second ("Gbps"), and each of the plurality of frame streams has a data rate less than 100 Gbps.

9. The system of claim 1, wherein the expected skew from the electrical and optical components is based at least in part on the expected skew from a Tx 100 G Ten Bit Interface ("CTBI"), a Tx optical module, an Rx optical module, and an Rx CTBI.

10. A method, comprising:
receiving a first information stream;
transforming the first information stream into a plurality of data blocks; and
multiplexing the plurality of data blocks of the first information stream onto a plurality of communication channels using one or more alignment blocks indicating alignments of the plurality of data blocks within the first information stream, wherein:
each of the one or more alignment blocks identifies a virtual lane on which the respective alignment block is placed;
each of the one or more alignment blocks is stored in a virtual lane buffer;
each virtual lane buffer is sized based on an amount of skew expected from electrical and optical components; and
the size of each virtual lane buffer is determined prior to the electrical and optical components generating skew.

11. The method of claim 10, wherein multiplexing the plurality of data blocks of the first information stream onto a plurality of communication channels using one or more alignment blocks comprises distributing the data blocks onto the plurality of communication channels round robin.

12. The method of claim 11, further comprising inserting the alignment blocks onto the plurality of communication channels periodically.

13. The method of claim 10, wherein each alignment block comprises 66 bits of data.

14. The method of claim 10, wherein each data block comprises 66 bits of data.

15. The method of claim 10, further comprising:
receiving, from the plurality of communication channels, a second information stream comprising a plurality of data blocks and one or more alignment blocks; and
de-multiplexing the data blocks of the second information stream using the one or more alignment blocks of the second information stream.

16. The method of claim 10, wherein the first information stream comprises an aggregate of a plurality of frame streams.

17. The method of claim 16, wherein the first information stream has a data rate of 100 gigabits per second ("Gbps"), and each of the plurality of frame streams has a data rate less than 100 Gbps.

18. A non-transitory computer storage readable medium including computer code such that the code is operable, when executed, to:
receive a first information stream;
transform the first information stream into a plurality of data blocks; and
multiplex the plurality of data blocks of the first information stream onto a plurality of communication channels using one or more alignment blocks indicating alignments of the plurality of data blocks within the first information stream, wherein:
each of the one or more alignment blocks identifies a virtual lane on which the respective alignment block is placed;
each of the one or more alignment blocks is stored in a virtual lane buffer;
each virtual lane buffer is sized based on an amount of skew expected from electrical and optical components; and
the size of each virtual lane buffer is determined prior to the electrical and optical components generating skew.

19. The medium of claim 18, wherein multiplexing the plurality of data blocks onto a plurality of communication channels using one or more alignment blocks comprises distributing the data blocks onto the plurality of communication channels round robin.

20. The medium of claim 19, wherein the code is further operable, when executed, to insert the alignment blocks onto the plurality of communication channels periodically.

21. The medium of claim 18, wherein each alignment block comprises 66 bits of data.

22. The medium of claim 18, wherein each data block comprises 66 bits of data.

23. The medium of claim 18, wherein the code is further operable, when executed, to:
receive, from the plurality of communication channels, a second information stream comprising a plurality of data blocks and one or more alignment blocks; and
de-multiplex the data blocks of the second information stream using the one or more alignment blocks of the second information stream.

24. The medium of claim 18, wherein the first information stream comprises an aggregate of a plurality of frame streams.

25. The medium of claim 24, wherein the first information stream has a data rate of 100 gigabits per second ("Gbps"), and each of the plurality of frame streams has a data rate less than 100 Gbps.

* * * * *